(12) United States Patent
Gautrot et al.

(10) Patent No.: US 11,415,042 B2
(45) Date of Patent: Aug. 16, 2022

(54) GAS INLET DUCT GENERATING AN AERODYNAMIC MOVEMENT OF GAS WITHIN A CYLINDER

(71) Applicant: IFP Energies nouvelles, Rueil-Malmaison (FR)

(72) Inventors: Xavier Gautrot, Rueil-Malmaison (FR); Martin Ritter, Rueil-Malmaison (FR); Christophe Lechard, Rueil-Malmaison (FR); Sebastien Charmasson, Reil-Malmaison (FR); Julien Trost, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/422,238

(22) PCT Filed: Jan. 13, 2020

(86) PCT No.: PCT/EP2020/050715
§ 371 (c)(1),
(2) Date: Jul. 12, 2021

(87) PCT Pub. No.: WO2020/151985
PCT Pub. Date: Jul. 30, 2020

(65) Prior Publication Data
US 2022/0090535 A1     Mar. 24, 2022

(30) Foreign Application Priority Data
Jan. 21, 2019    (FR) ...................................... 1900507

(51) Int. Cl.
*F02M 35/10*    (2006.01)
*F02B 31/04*    (2006.01)
*F02F 1/42*     (2006.01)

(52) U.S. Cl.
CPC ............ *F02B 31/04* (2013.01); *F02F 1/4235* (2013.01)

(58) Field of Classification Search
CPC ............ F02B 2075/125; F02B 2275/48; F02B 2023/106; F02F 1/4214; F02F 2001/245
(Continued)

(56) References Cited

U.S. PATENT DOCUMENTS

| | | | | |
|---|---|---|---|---|
| 5,709,190 A | * | 1/1998 | Suzuki | F02D 13/0226 123/302 |
| 6,843,224 B2 | * | 1/2005 | Ha | F02M 23/006 123/585 |
| 2020/0309020 A1 | * | 10/2020 | Taki | F02F 3/26 |

FOREIGN PATENT DOCUMENTS

| | | |
|---|---|---|
| DE | 10128500 C1 | 2/2003 |
| EP | 0790398 A1 | 8/1997 |

(Continued)

OTHER PUBLICATIONS

International Search Report dated Feb. 13, 2020 in International Patent Application PCT/EP2020/050715.

*Primary Examiner* — Long T Tran
*Assistant Examiner* — James J Kim
(74) *Attorney, Agent, or Firm* — Fitch, Even, Tabin & Flannery, LLP

(57) ABSTRACT

The present invention relates to a gas intake pipe (2) for a cylinder of a thermal engine. The pipe comprises means for diverting the gas so as to generate a tumble type aerodynamic motion of the gas within the cylinder. The diversion means comprise at least a "ramp" shape (6) on the lower profile (12) of the pipe and a concave zone on the upper profile (10) of intake pipe (2).

16 Claims, 4 Drawing Sheets

(58) Field of Classification Search
USPC .......................................... 123/184.21, 294
See application file for complete search history.

(56) References Cited

FOREIGN PATENT DOCUMENTS

| | | | |
|---|---|---|---|
| EP | 2787208 | A1 | 10/2014 |
| FR | 2780093 | A3 | 12/1999 |
| FR | 2902464 | A1 | 12/2007 |
| FR | 2923268 | A1 | 5/2009 |
| JP | 2005105946 | A | 4/2005 |

\* cited by examiner

[Fig 1]
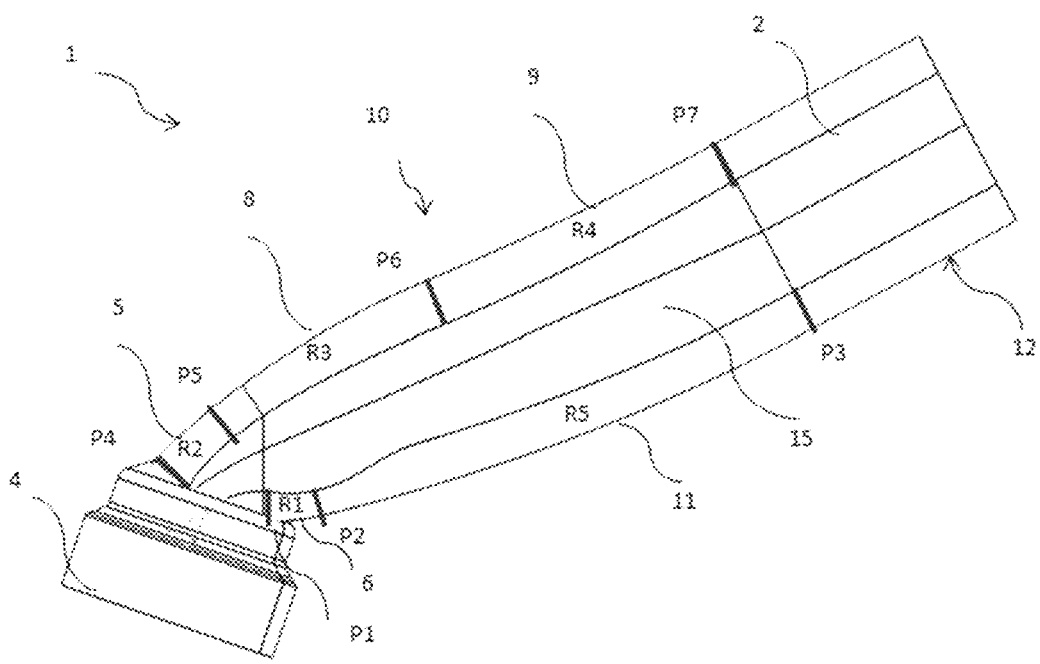
[Fig 2]
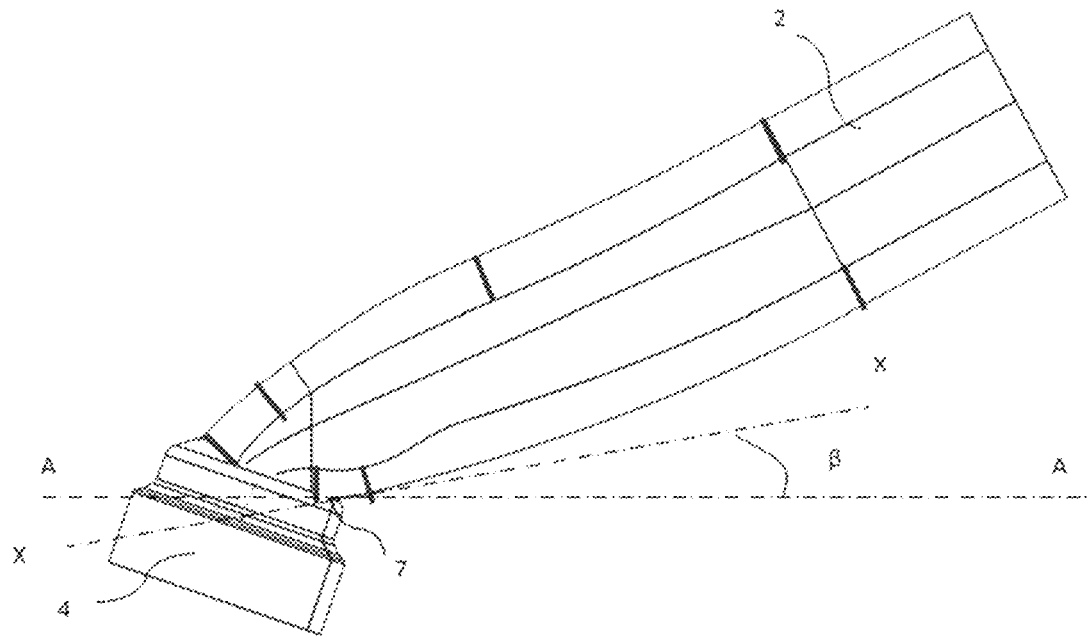

[Fig 3]
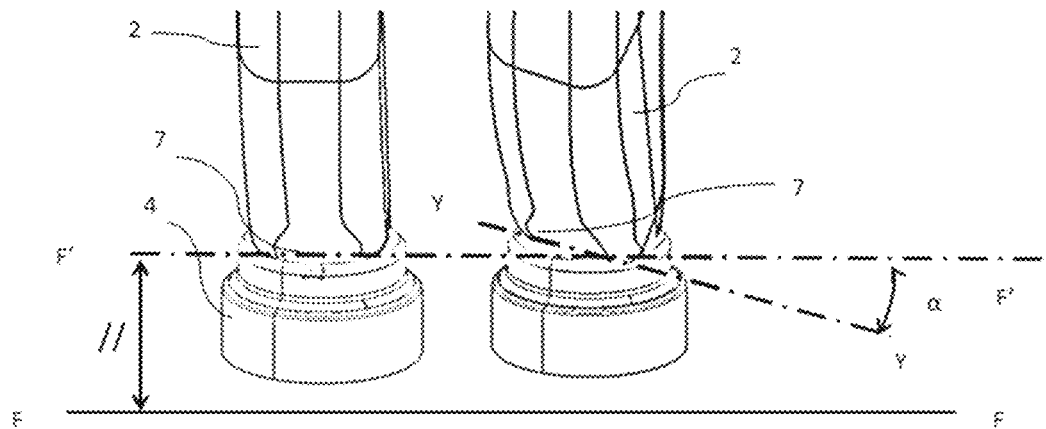
[Fig 4]
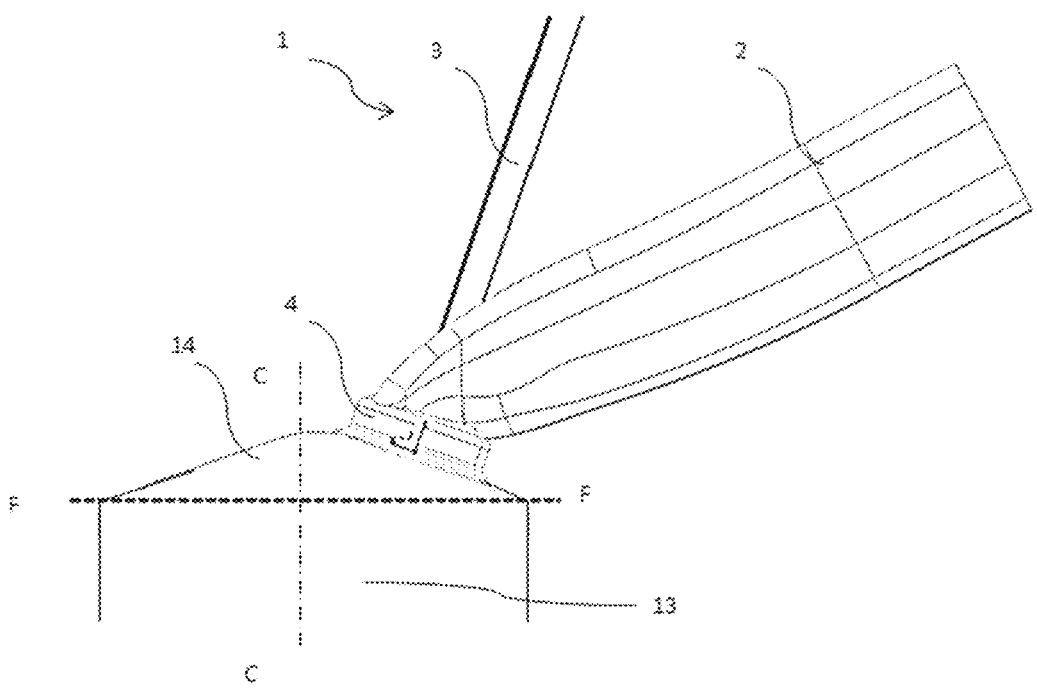

[Fig 5]
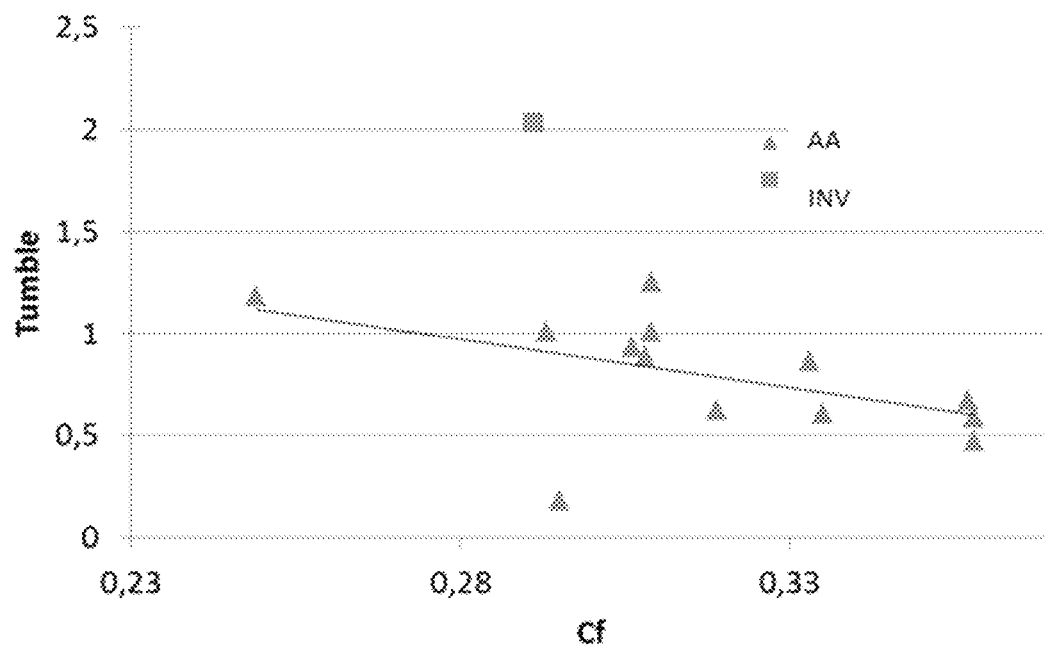
[Fig 6]
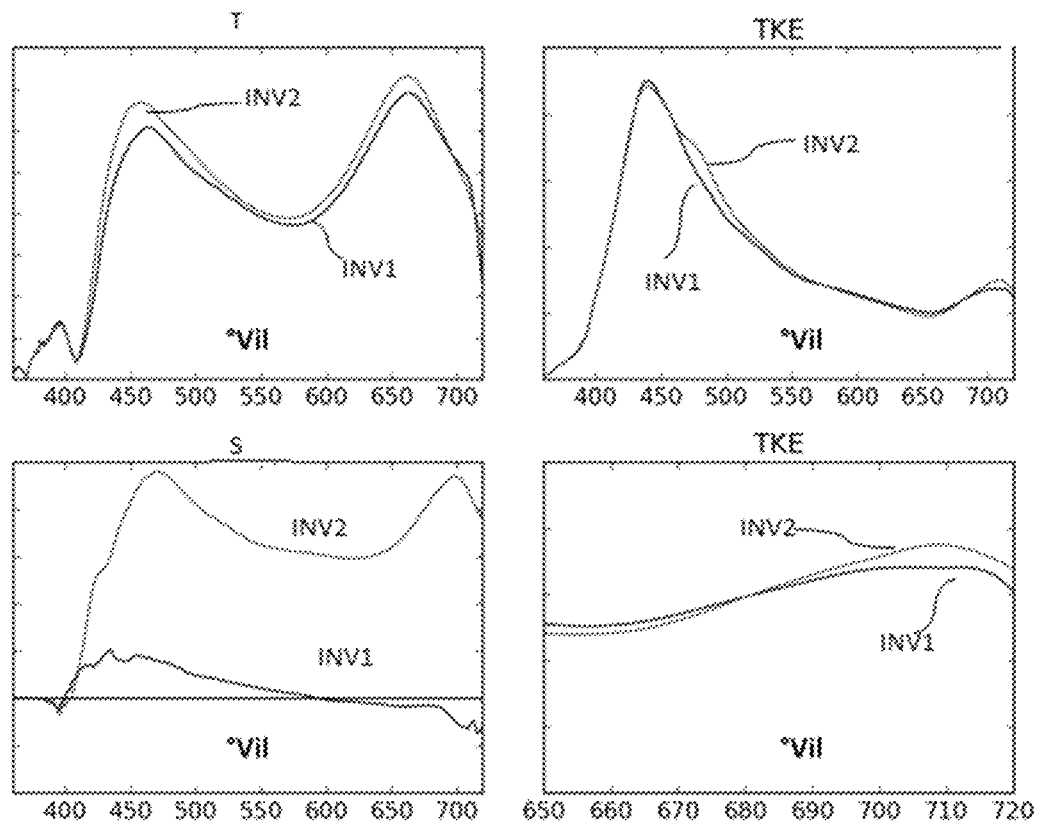

[Fig 7]
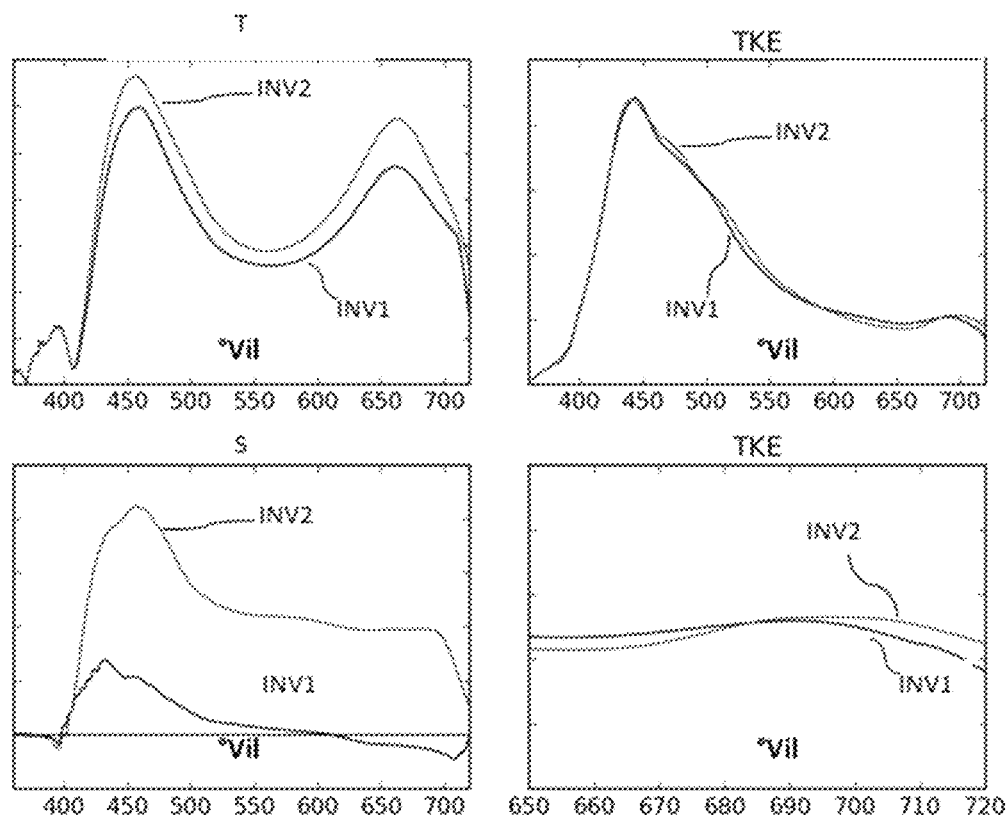
[Fig 8]
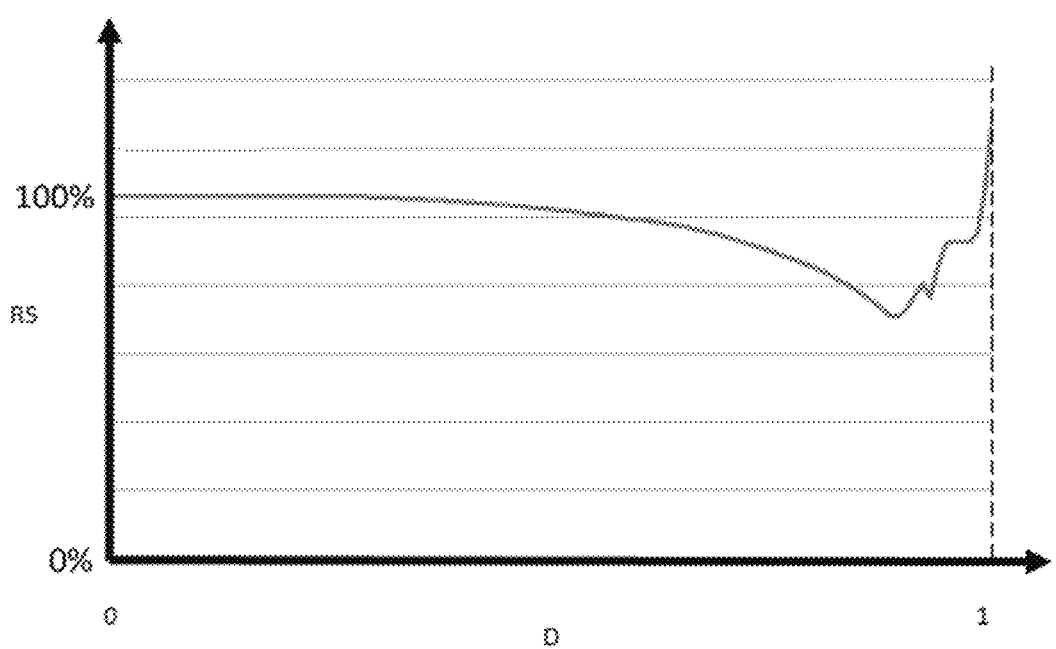

GAS INLET DUCT GENERATING AN AERODYNAMIC MOVEMENT OF GAS WITHIN A CYLINDER

CROSS-REFERENCE TO RELATED APPLICATIONS

This application is a U.S. national phase application filed under 35 U.S.C. § 371 of International Application No. PCT/EP2020/050715, filed Jan. 13, 2020, designating the United States, which claims priority from French Patent Application No. 19/00.507 filed Jan. 21, 2019, which are hereby incorporated herein by reference in their entirety for all purposes.

FIELD OF THE INVENTION

The present invention relates to the field of gas intake pipes for an internal-combustion engine. In particular, the present invention relates to gas intake pipes allowing an aerodynamic gas motion to be generated in the engine cylinder.

This type of engine generally comprises at least one cylinder, a piston sliding in this cylinder in a reciprocating rectilinear motion, intake means for an oxidizer, burnt gas exhaust means, a combustion chamber and injection means for injecting a fuel.

As is generally admitted, when designing an engine, the performance and pollutant emission constraints are increasingly high, therefore new solutions need to be found to increase the final engine efficiency.

Increasing the combustion efficiency thus is a key point to limit emissions for equal or greater performance. It is therefore of great importance that all of the fuel present in the combustion chamber be used by an oxidizer comprising for example air at ambient pressure, supercharged air, or a mixture of air (supercharged or not) and of recirculated burnt gas.

Indeed, the fuel mixture (oxidizer/fuel) in the combustion chamber needs to be as homogeneous as possible.

Furthermore, in order to ensure good efficiency and combustion rate, it is desirable to have a high turbulence level, and more specifically a high turbulent kinetic energy level, upon ignition of the fuel mixture and during the subsequent combustion.

This high turbulence level can be obtained by means of particular intake aerodynamics, tumble (rotational motion of the gas in the cylinder about a longitudinal engine axis) or swumble. The latter type of aerodynamics is characterized in that the macroscopic motion of the fuel mixture is a combination of swirl (rotational motion of the gas in the cylinder about a cylinder axis) and tumble (rotational motion of the gas in the cylinder about a longitudinal engine axis, generally perpendicular to the cylinder axis).

Swirl, which is a macroscopic rotational motion of the fuel mixture about an axis collinear to the cylinder axis, is characterized by good motion conservation during the intake process, and more specifically during the rise of the piston. It is an aerodynamic macroscopic motion that is generally used for compression-ignition internal-combustion engines, for which it is a good way to homogenize the fuel mixture.

Tumble is also a macroscopic rotational motion of the fuel mixture, but about an axis globally perpendicular to the cylinder axis. It has the specific feature of turning into microscopic aerodynamic motions that create turbulence as the piston rises. It is an aerodynamic macroscopic motion that is generally used for spark-ignition internal-combustion engines, for which it is a good way to obtain a suitable combustion rate. Besides, this motion is quite sensitive to the combustion chamber geometry and to the lift law, in terms of spread as well as maximum lift height.

Using swumble allows to benefit from the advantages of the two aerodynamic structures detailed above and thus from excellent homogenization and a better combustion rate, thanks to a higher turbulence level during the compression phase than the levels observed with the best current spark-ignition engines.

BACKGROUND OF THE INVENTION

Various technical solutions have been developed to achieve these turbulent flows in the cylinder.

A first solution is notably described in U.S. Pat. No. 6,606,975. This solution consists in controlling a flap arranged in the intake pipe so as to generate turbulence. This patent further mentions the notion of low load swumble. Such a solution is complex and penalizing as regards cylinder filling.

A second solution is notably described in U.S. Pat. No. 5,056,486. This solution provides a definition of asymmetrical intake pipes allowing complex aerodynamics to be generated. However, this solution requires phase shift of the intake valves opening, which is penalizing at high loads.

A third solution is notably described in patent applications DE-10,128,500 and EP-1,783,341. This solution allows complex aerodynamics to be generated by means of passive or active appendages in the intake pipe. In both cases, these appendages limit cylinder filling with gas. Furthermore, active appendages require a control system making the solution more complex.

SUMMARY OF THE INVENTION

To overcome these drawbacks, the present invention relates to a gas intake device for a cylinder of a thermal engine. The pipe comprises means for diverting the gas so as to generate a tumble type aerodynamic motion of the gas within the cylinder. The diversion means comprise at least a "ramp" shape on the lower profile (intrados) of the pipe and a concave zone on the upper profile (extrados) of the pipe. The goal of the invention is to generate a tumble type aerodynamic motion of the gas in the cylinder without a flap being arranged in the pipe, without intake pipe opening phase shift and without passive or active appendages in the intake pipe. A "ramp" is understood to be an element promoting detachment of the gas stream from the lower profile. This ramp shape and this concave zone are so dimensioned as to generate a high-velocity gas stream, which subsequently allows to generate a flawless tumble type turbulence. The pipe according to the invention further provides an interesting compromise between tumble type aerodynamic gas motion and cylinder filling.

The invention further relates to such an intake pipe with means for also generating swirl (and therefore swumble).

The invention relates to a gas intake pipe for a cylinder of an internal-combustion engine, said intake pipe comprising means for diverting said gas so as to generate an aerodynamic motion of said gas within said cylinder about an axis substantially perpendicular to the axis of said cylinder, said diversion means comprising a ramp shape on the lower profile of said intake pipe, and a concave shape of the upper profile of said intake pipe, said lower and upper profiles of said intake pipe being defined in position of use of said intake pipe. The radius of curvature of the lower profile forming said ramp is less than 40 mm, and said concave shape of said upper profile comprises an intermediate zone whose radius of curvature ranges between 50 and 150 mm, and a final zone whose radius of curvature ranges between 10 and 100 mm, said final zone facing said ramp shape of said lower profile.

According to an embodiment, the radius of curvature of said lower profile forming said ramp ranges between 20 and 30 mm, preferably between 25 and 27 mm.

According to an implementation, said radius of curvature of said intermediate zone ranges between 100 and 130 mm.

According to an aspect, said radius of curvature of said final zone ranges between 60 and 70 mm.

According to an embodiment, said lower profile comprises an initial zone of concave shape whose radius of curvature ranges between 200 and 350 mm, preferably between 230 and 300 mm, and more preferably between 270 and 280 mm.

Advantageously, the arc length of said ramp shape ranges between 6 and 9% of the arc length of said concave shape of said initial zone of said lower profile, preferably it substantially corresponds to one thirteenth of the arc length of said concave shape of said initial zone of said lower profile.

According to an implementation, said upper profile comprises an initial zone of convex shape, and preferably the radius of curvature of said initial zone of said upper profile is greater than or equal to 400 mm.

Preferably, the arc length of said initial zone of said upper profile is substantially equal to the sum of the arc lengths of said intermediate and final zones of said upper profile.

Advantageously, the ratio of the maximum cross-sectional area to the minimum cross-sectional area of said intake pipe ranges between 1 and 2, and it preferably is 1.5.

According to an aspect, said means for diverting said gas further have an inclination of said intake pipe defined by an angle β of tangent to the point of intersection of said intake pipe with the outlet of said intake pipe ranging between 0° and 45°, preferably between 5° and 45°.

According to a feature, said intake pipe comprises means for generating an aerodynamic motion of said gas within said cylinder about an axis parallel to the axis of said cylinder.

The invention also relates to a gas intake device for a cylinder of an internal-combustion engine, said gas intake device comprising an intake pipe according to one of the above features, at least one intake valve arranged within said intake pipe, at least one calibration part of said intake valve arranged at one end of said intake pipe and directed at the fire face of said cylinder. On said lower profile of said intake pipe, the intersection between said intake pipe and said calibration part of said intake valve is on a generatrix forming an angle α ranging between 5° and 45° with respect to a plane parallel to said fire face of said cylinder passing through a point of intersection between said intake pipe and said calibration part.

According to an aspect, said angle α ranges between 5° and 20°, preferably between 8° and 15°.

Furthermore, the invention relates to an internal-combustion engine comprising at least one cylinder provided with at least one intake pipe according to one of the above features, at least one exhaust pipe and fuel injection means.

Furthermore, the invention relates to a use of an internal-combustion engine according to one of the above features for a Miller cycle or an Atkinson cycle.

BRIEF DESCRIPTION OF THE FIGURES

Other features and advantages of the device according to the invention will be clear from reading the description hereafter, given by way of non limitative example, with reference to the accompanying figures wherein:

FIG. 1 illustrates an intake pipe according to an embodiment of the invention in its operating position, FIG. 2 is a parametrization of an intake pipe according to an embodiment of the invention in its operating position, FIG. 3 illustrates views of the intrados of a gas intake device according to a first and a second variant embodiment of the invention respectively, in its operating position, FIG. 4 illustrates a cylinder of an internal-combustion engine according to an embodiment of the invention, in its operating position, FIG. 5 is a graph of the tumble-permeability compromise for intake pipes according to the prior art and for the pipe according to the invention, FIG. 6 illustrates curves of the tumble number, the turbulent kinetic energy (TKE), the swirl number within the context of a standard law for an intake device according to a first variant embodiment of the invention and for an intake device according to a second variant embodiment of the invention, FIG. 7 illustrates curves of the tumble number, the turbulent kinetic energy (TKE), the swirl number within the context of a Miller law for an intake device according to a first variant embodiment of the invention and for an intake device according to a second variant embodiment of the invention, and FIG. 8 is a curve of the evolution of the intake pipe section as a function of the distance of the measurement plane with respect to the intake pipe inlet.

DETAILED DESCRIPTION OF THE INVENTION

The present invention relates to a gas intake pipe for a cylinder of an internal-combustion engine. Such an intake pipe comprises an inlet through which the gas flows in, and an outlet through which the gas flows out and into the cylinder.

According to the invention, the intake pipe comprises means for diverting the gas so as to generate an aerodynamic motion of the gas within the cylinder about an axis substantially perpendicular to the axis of the cylinder. In other words, the intake pipe comprises means for generating a tumble type aerodynamic motion of the gas in the cylinder. It is reminded that tumble has the specific feature of turning into microscopic aerodynamic motions that create turbulence as the piston rises. It is an aerodynamic macroscopic motion that is generally used for spark-ignition internal-combustion engines for which it is a good way to obtain a suitable combustion rate. Besides, this motion is quite sensitive to the combustion chamber geometry and to the lift law, in terms of spread as well as maximum lift height.

The intake pipe comprises a lower profile (intrados) and an upper profile (extrados) defined in the operating position of the intake pipe. The lower profile and the upper profile are connected by two lateral walls.

The gas diversion means comprise a "ramp" of concave shape on the lower profile (intrados) of the intake pipe and a concave shape of the upper profile (extrados) of the intake pipe. The ramp shape promotes detachment of the gas stream in the intake pipe and sends it to the upper part of the intake pipe, therefore to the upper part of the cylinder, so as to maximize the tumble type aerodynamic motion of the gas. The concave shape of the upper profile gives the intake pipe a convergent shape promoting the gas velocity increase. Furthermore, this combination of the ramp shape and of the concavity of the upper profile provides a tumble type aerodynamic gas motion without any particular appendage of mask, flap or blade type.

The ramp shape of the lower profile is achieved with a curvature of the lower profile whose radius of curvature is less than or equal to 40 mm. The concavity of the upper profile is achieved by means of two consecutive concave zones in the direction of flow of the gas, referred to as intermediate zone and final zone respectively. The final zone of the upper profile faces, within the intake pipe, the ramp shape of the lower profile. This zone is referred to as final because it is positioned at the intake pipe outlet. The radius of curvature of the final zone ranges between 10 and 100 mm, and the radius of curvature of the intermediate zone ranges between 50 and 150 mm.

The combination of the ramp shape and of the concave zone, with specific dimensions, allows a high-velocity gas stream to be generated, which subsequently allows a flawless tumble type turbulence to be generated. The intake pipe according to the invention further provides a good tumble-cylinder filling compromise.

Advantageously, the radius of curvature of the final zone can be smaller than the radius of curvature of the intermediate zone, thus the gas velocity increases within the intake pipe since the cross-sectional area decreases.

Preferably, in order to improve the ramp effect without limiting the filling of the cylinder, the radius of the ramp shape can range between 20 and 30 mm, and more preferably it can range between 25 and 27 mm. Indeed, the smaller the radius of curvature of the ramp zone, the more the intake pipe promotes the generation of the tumble type aerodynamic gas motion, to the detriment of cylinder filling, and on the other hand, the larger the radius of curvature of the ramp zone, the more the intake pipe promotes filling of the cylinder, to the detriment of the generation of the tumble type aerodynamic gas motion.

Advantageously, the radius of curvature of the intermediate zone of the upper profile can range between 100 and 300 mm. This range allows the generation of the convergent effect to be optimized.

Advantageously, the radius of curvature of the final zone of the upper profile can range between 60 and 70 mm. This range also allows the generation of the convergent effect to be optimized.

According to an embodiment of the invention, the lower profile (intrados) of the intake pipe can comprise an initial zone of concave shape. The zone is referred to as initial because it is close to the intake pipe inlet. The initial zone of the lower profile determines the general shape of the pipe and influences parameters such as filling and robustness of the intake pipe. The initial zone is directly followed by the ramp-shaped zone.

For this embodiment, the radius of curvature of the initial zone of the lower profile can range between 200 and 350 mm, preferably between 230 and 300 mm, and more preferably between 270 and 280 mm. These value ranges allow filling and robustness of the intake pipe to be optimized.

Furthermore, for this embodiment, the arc length of the ramp shape can range between 6 and 9% of the arc length of the initial zone of concave shape of the lower profile, preferably the arc length of the ramp shape can substantially correspond to one thirteenth of the arc length of the initial zone of concave shape of the lower profile. The ratio between the arc lengths of the lower profile is then ideal in terms of generation of tumble type aerodynamic gas motion.

According to an implementation of the invention, the upper profile (extrados) of the intake pipe can comprise an initial zone (in the direction of flow of the gas through the intake pipe) of convex shape. The zone is referred to as initial because it is close to the intake pipe inlet. The convex initial zone of the upper profile determines the inlet section of the intake pipe. Preferably, the initial zone of the upper profile is geometrically similar to the initial zone of the lower profile. The initial zone is directly followed by the intermediate zone, itself directly followed by the final zone. For this implementation of the invention, the upper profile comprises three zones having distinct radii of curvature.

For this implementation of the invention, the radius of curvature of the initial zone of convex shape of the upper profile can be greater than 400 mm, so that it is large.

Furthermore, for this implementation of the invention, the arc length of the convex initial zone can be substantially equal to the sum of the arc lengths of the intermediate zone and the final zone of the upper profile. The ratio between the arc lengths of the upper profile is then ideal in terms of generation of tumble type aerodynamic gas motion.

According to an aspect of the invention, the convergent of the pipe, i.e. the evolution of the cross-sectional area of the intake pipe, can be so selected that the ratio of the maximum cross-sectional area of the intake pipe to the minimum cross-sectional area of the intake pipe ranges between 1 and 2, and it preferably is 1.5. It is thus possible to form a "clean" tumble.

According to an aspect of the invention, the cross-sectional area of the intake pipe can have a substantially rectangular shape, with rounded corners. In this case, the intersection of the intake pipe and the calibration part of the valve consists of four edges: one on the intrados side, one on the extrados side and two lateral ones.

According to a feature of the invention, the shape of the cross-sectional area of the intake pipe can include a horizontal straight part in the lower zone thereof, in operating position of the intake pipe. This shape promotes the generation of a swumble type aerodynamic motion.

According to an example embodiment, the gas diversion means can further comprise an inclination of the intake pipe. This intake pipe inclination can be defined by an angle β of tangent to the point of intersection of the intake pipe with the calibration part ranging between 0° and 45°, preferably between 5° and 45°. This inclination can be coupled with the slope of the upper part of the combustion chamber of the cylinder. The intake pipe inclination allows the gas stream flowing into the cylinder to be inclined so as to form a tumble type aerodynamic gas motion. For example, optimization of the tumble type aerodynamic gas motion can be obtained with a tangency between angle β and the angle of the slope of the upper part of the combustion chamber.

According to an embodiment of the invention, the intake pipe can further comprise means for generating an aerodynamic gas motion within the cylinder about an axis collinear to the cylinder axis. In other words, the intake pipe can comprise means for generating a swirl type aerodynamic gas motion. Therefore, in combination with the means for generating a tumble type aerodynamic gas motion, this embodiment allows to generate a swumble type aerodynamic gas motion.

It is reminded that swirl is characterized by a good conservation of the gas-fuel mixture during the intake process, and more specifically during the rise of the piston. It is an aerodynamic macroscopic motion that is generally used for compression-ignition internal-combustion engines, for which it is a good way to homogenize the fuel mixture.

Using swumble allows to benefit from the advantages of the two aerodynamic structures of tumble and swirl type, and thus from excellent homogenization and a better combustion rate, thanks to a higher turbulence level during the compression phase than the levels observed with the best current spark-ignition engines.

Furthermore, the invention relates to a gas intake device for a cylinder of an internal-combustion engine.

The gas intake device comprises:
a gas intake pipe for supplying gas to a cylinder according to any one of the variant combinations described above, i.e. with gas diversion means for generating a tumble type and, if required, a swumble type aerodynamic motion,
an intake valve inserted in the intake pipe, opening of the valve allowing gas to flow into the cylinder, and
an intake valve calibration part arranged at the end of the intake valve on the cylinder side, the calibration part being directed at the fire face of the cylinder, the intake valve calibration part being a substantially cylindrical mechanical part in which the valve moves.

The fire face or combustion face is understood to be the lower plane of the cylinder head (of the internal-combustion engine) orthogonal to the cylinder axis. The valve calibration part is inserted in the lower plane of the cylinder head so as to supply gas to the cylinder.

According to an embodiment of the invention, the intake device is formed in such a way that, at the intrados (lower profile) of said intake pipe, the intersection between the intake pipe and the valve calibration part is on a generatrix forming an angle α ranging between 5° and 45°, with respect to a plane parallel to the fire face and passing through a point of intersection between the intake pipe and the valve calibration part. The intrados of the intake pipe is understood to be the lower face of the intake pipe. Thus, the intersection of the lower face of the intake pipe with the valve calibration part is inclined with respect to a plane parallel to the fire face. This inclination allows the gas to be diverted at the calibration part inlet and, a fortiori, at the cylinder inlet. This gas diversion generates an aerodynamic gas motion in the cylinder, in a direction parallel to the cylinder axis, in other words, a swirl type aerodynamic gas motion. This inclination can result in a rotation of the intake pipe at the end thereof (the end of the intake pipe is then twisted), which promotes the swirl type aerodynamic motion of the gas. Furthermore, this embodiment allows to generate a swirl type aerodynamic gas motion without any particular appendage of mask, flap or blade type. Moreover, the architecture of these intake devices involves no additional constraint for arrangement within a cylinder head of a single-cylinder or multi-cylinder internal-combustion engine.

The inclination at an angle α ranging between 5° and 45° allows a swirl type aerodynamic gas motion to be generated. Below 5°, the inclination is insufficient to provide a significant influence on the aerodynamic motion of the gas in the cylinder. Above 45°, the geometry of the intake pipe is complex and difficult to achieve, and the gas aerodynamics degrades.

By combining aerodynamic gas motions of tumble type and swirl type, the gas intake device according to the invention provides a swumble type aerodynamic motion of the gas in the cylinder, which allows to benefit from excellent homogenization and a better combustion rate thanks to a higher turbulence level during the compression phase than those observed with the best current spark-ignition engines.

According to an embodiment of the invention, angle α can range between 5° and 20°, preferably between 8° and 15°. These angle ranges allow to optimize the swirl type aerodynamic gas motion, and thus to optimize the combined swumble type aerodynamic gas motions.

According to an implementation of the invention, the calibration part can comprise a mask partly covering the calibration part outlet so as to orient the gas in the cylinder and thus to promote the aerodynamic motion of the gas.

The gas is an oxidizer or a fuel mixture (indirect injection), and it can notably comprise air at ambient pressure, supercharged air, or a mixture of air (supercharged or not) and burnt gas.

FIG. 1 schematically illustrates, by way of non limitative example, an intake device in operating mode position according to an embodiment of the invention. FIG. 1 is a side view. Intake device 1 comprises an intake pipe 2, a valve (not shown) and a calibration part 4 for the intake valve.

Intake pipe 2 has an upper profile 10 (extrados) and a lower profile 12 (intrados). The upper 10 and lower 12 profiles are connected by two lateral walls 15. The various zones of the upper and lower profiles are limited by thick lines with points P1 to P7.

Lower profile 12 comprises, at the intake pipe outlet, a zone forming a ramp 6 of concave shape, delimited by points P1 and P2. The radius of curvature R1 of this zone is less than 40 mm and it is for example equal to 26 mm. Lower profile 12 further comprises an initial zone 11 of concave shape, delimited by points P2 and P3. The radius of curvature R5 of this zone ranges between 200 and 350 mm, and it is for example equal to 275 mm.

Upper profile 10 comprises, at the intake pipe outlet, a final zone 5 of concave shape, delimited by points P4 and P5. The radius of curvature R2 of this final zone 5 ranges between 10 and 100 mm, and it is for example equal to 65 mm. Upper profile 10 further comprises an intermediate zone 8 of concave shape, delimited by points P5 and P6. The radius of curvature R3 of this intermediate zone 8 ranges between 50 and 150 mm, and it is for example equal to 115 mm. Upper profile 10 additionally comprises an initial zone 9 of convex shape, delimited by points P6 and P7. The radius of curvature R4 of this initial zone is greater than 400 mm, and it is for example equal to 500 mm.

FIG. 2 is a view similar to FIG. 1 for an embodiment of the invention. For this embodiment, the gas diversion means intended to generate a tumble type aerodynamic gas motion further include the inclination of intake pipe 2 at an angle β, between a direction XX of tangent to the point of intersection of intake pipe 2 with calibration part 4, and a horizontal direction AA. This inclination promotes the tumble type aerodynamic motion of the gas.

FIG. 3 schematically illustrates, by way of non-limitative example, views of the intrados (lower face) of the gas intake device. FIG. 3 is in a plane perpendicular to the fire face. The figure on the left corresponds to a device according to a first variant embodiment of the invention having only gas diversion means for generating a tumble type aerodynamic motion of the gas. The figure on the right corresponds to a device according to a second variant embodiment of the invention with gas diversion means for generating a tumble type aerodynamic gas motion and, at the intrados, an inclination of the intersection between the intake pipe and the valve calibration part for generating a swirl type aerodynamic gas motion.

In these figures, line FF belongs to the plane of the fire face (defined by the cylinder, not shown), and direction F'F' is a line belonging to a plane parallel to fire face FF passing through a point of intersection between intake pipe 2 and intake valve calibration part 4.

According to the first variant embodiment illustrated in the left figure, intersection 7 between intake pipe 2 and intake valve calibration part 4 merges with line F'F'.

On the other hand, according to the second variant embodiment illustrated in the right figure, intersection 7 between intake pipe 2 and intake valve calibration part 4 is carried by a generatrix of axis YY inclined at an angle α with respect to line F' F'. This angle α ranges between 5° and 45°. It can be seen in the right figure that this inclination generates, close to the connection, a slight rotation of intake pipe 2, which has a substantially rectangular cross-sectional area.

FIG. 8 is a curve representing the section ratio RS as a function of distance D of the section with respect to the intake pipe inlet for an example embodiment of the invention. Section ratio RS corresponds to the area of the section considered with respect to the area of the section of the intake pipe at the inlet. The distance is normalized: distance 0 corresponds to the inlet of the intake pipe and distance 1 corresponds to the outlet of the intake pipe. This curve shows an initial quasi-constancy, then a decrease in the section ratio, due notably to the ramp shape and to the final zone of the upper profile, then a sharp section ratio increase at the intake pipe outlet. For this example, the ratio of the maximum section to the minimum section of the intake pipe is about 1.8.

The invention also relates to an assembly comprising a cylinder of an internal-combustion engine and an intake device according to one of the variants or variant combinations described above.

Moreover, the present invention relates to a cylinder-intake device assembly according to one of the variants or variant combinations described above for supplying gas to the cylinder.

Furthermore, the present invention relates to an internal-combustion engine comprising at least one cylinder, each cylinder being provided with:
- at least one intake device according to one of the variants or variant combinations described above, for supplying gas to the cylinder,
- at least one exhaust device for discharging the burnt gas from the cylinder, the exhaust device being advantageously equipped with an exhaust valve,
- a piston having a reciprocating rectilinear translational motion in the cylinder for generating mechanical energy from the combustion (by rotation of a crankshaft),
- fuel injection means, for generating combustion.

According to an embodiment, the fuel injection means can be direct injection means, i.e. the fuel injection means are directly arranged in the cylinder.

Alternatively, the fuel injection means can be indirect injection means, i.e. the fuel injection means are arranged in the intake device.

According to an implementation of the invention, the internal-combustion engine is a spark-ignition engine. In this case, the engine further comprises at least one plug for generating combustion of the gas/fuel mixture.

Alternatively, the internal-combustion engine is a compression-ignition engine. In this case, the engine comprises no plug for generating combustion of the gas/fuel mixture.

According to an aspect of the invention, when the cylinders comprise two intake pipes, these two pipes can be identical and parallel with respect to the median plane of the combustion chamber.

In a variant, the cylinders can be supplied with gas through a siamese intake device.

The internal-combustion engine can comprise a plurality of cylinders, notably 3, 4, 5 or 6 cylinders.

The cylinder bore can have any dimensions. However, the invention is particularly suitable for a cylinder bore of about 75 mm.

FIG. 4 schematically illustrates, by way of non-limitative example, a partial view of a cylinder of an internal-combustion engine in operating mode position according to an embodiment of the invention. Cylinder 13, in which a piston (not shown) moves, comprises a combustion chamber 14. An intake device 1, in particular valve calibration part 4, opens into combustion chamber 14. An exhaust device (not shown) is also arranged in combustion chamber 14.

The axial direction of cylinder 13 is denoted by CC. This figure also shows fire face FF, which is perpendicular to axis CC, fire face FF corresponding to the lower part of the cylinder head (not shown) of the internal-combustion engine.

Intake device 1 is identical to the intake device of FIGS. 1, 2 and 3, and it notably comprises an intake pipe 2, a valve 3 and a valve calibration part 4.

Moreover, the present invention relates to the use of an internal-combustion engine according to one of the variants or variant combinations described above in connection with a Miller cycle or an Atkinson cycle.

The Miller cycle is a thermodynamic cycle characterized by an intake valve(s) closure before the bottom dead center of the piston during the intake phase. This provides increased work recovery, in addition to cooling of the charge admitted. The intake device according to the invention is particularly suited for use in a so-called Miller cycle over a wide operating range, thanks to the generation of a swumble type aerodynamic motion of the gas.

The Atkinson cycle is a thermodynamic cycle used notably in variable-combustion engines.

The internal-combustion engine according to the invention can be used in the field of embedded applications, such as road, sea or air transport, or in the field of stationary installations such as a generator set.

Examples

The features and advantages of the intake pipe according to the invention will be clear from reading the application examples below.

FIG. 5 is a graph of the tumble coefficient as a function of a permeability coefficient Cf. The tumble coefficient is defined as the ratio of the angular speed of the gas around the centre of mass in direction x (direction perpendicular to the cylinder axis) to the angular speed of the crankshaft, and the permeability coefficient corresponds to the ability of the intake pipe to allow an air stream to pass through with respect to the available cross-sectional area. The permeability coefficient is thus related to the cylinder filling. In the figure, the intake pipes available on the market AA (according to the prior art) are represented by triangles and the intake pipe according to the invention INV is represented by a square. It appears that the intake pipe according to the invention INV provides a better compromise between a high tumble coefficient and the permeability coefficient than the solutions from the prior art AA. Indeed, for an identical permeability coefficient Cf, the tumble coefficient obtained with the intake pipe according to the invention is twice that of the intake pipe according to the prior art.

For the second examples, the characteristics of an internal-combustion engine equipped with an intake device according to a first variant, with only a tumble type aerodynamic motion of the gas (corresponding to FIG. 3 on the left), are compared with the same internal-combustion engine equipped with an intake device according to a second variant of the invention and having a swumble type aerodynamic motion of the gas (corresponding to FIG. 3 on the right). For this example, the value of angle α is 15°.

FIG. 6 shows the curves of the tumble number T (top left), of the turbulent kinetic energy TKE (top right) and of the swirl number S (bottom left) as a function of the crank angle °Vil for a part of the engine cycle from the intake bottom dead centre (360°) to the compression top dead centre (720°). The bottom right figure illustrates turbulent kinetic energy TKE for a reduced angular range zone of crank angle °Vil close to the combustion that takes place after the compression top dead centre (720° crank angle). The tumble number in a direction x is defined as the ratio of the angular speed of the gas around the centre of mass in direction x (direction perpendicular to the cylinder axis) to the angular speed of the crankshaft. The swirl number is defined as the ratio of the angular speed of the gas around the centre of mass in the direction of the cylinder axis to the angular speed of the crankshaft. The tumble number and the swumble number are dimensionless numbers.

FIG. 6 relates to a standard cycle. In these figures, the curves corresponding to the internal-combustion engine equipped with an intake device according to the first variant are denoted by INV1, and the curves corresponding to the internal-combustion engine equipped with an intake device according to the second variant of the invention are denoted by INV2.

The turbulent kinetic energy TKE represents the amount of energy "entrapped" in the air mass.

It is noted in these figures that the two intake devices allow a tumble type aerodynamic motion to be generated (high tumble number T). Furthermore, it is noted that swirl number S is much higher for the intake device according to the second variant INV2. Therefore, the inclination of the intersection between the intake pipe and the calibration part effectively allows a swirl type aerodynamic motion to be generated. The device according to the second variant thus effectively allows a swumble type (tumble and swirl) aerodynamic motion to be generated. Besides, it is noted that the intake device according to the second variant provides a turbulent kinetic energy TEK gain in relation to the first variant, by allowing an increase in this turbulent energy before combustion.

FIG. 7 shows the curves of tumble number T (top left), of turbulent kinetic energy TKE (top right) and of swirl number S (bottom left) as a function of the crank angle °Vil for a part of the engine cycle from the intake bottom dead centre (360°) to the compression top dead centre (720°). The bottom right figure illustrates turbulent kinetic energy TKE for a reduced angular range zone of crank angle °Vil close to the combustion that takes place after the compression top dead centre (720° crank angle). FIG. 7 concerns a Miller cycle. In these figures, the curves corresponding to the internal-combustion engine equipped with an intake device according to the first variant are denoted by INV1, and the curves corresponding to the internal-combustion engine equipped with an intake device according to the second variant are denoted by INV2.

It is noted in these figures that the two intake devices allow a tumble type aerodynamic gas motion to be generated (high tumble number T). Furthermore, it is noted that swirl number S is much higher for the intake device according to the second variant INV2. Therefore, the inclination of the intersection between the intake pipe and the calibration part effectively allows a swirl type aerodynamic gas motion to be generated. The device according to the second variant thus effectively allows a swumble (tumble and swirl) type aerodynamic motion to be generated. Besides, it is noted that the intake device according to the first variant provides a turbulent kinetic energy TEK gain in relation to the second variant, by allowing an increase in this turbulent energy before combustion.

Thus, the generation of a swirl type aerodynamic gas motion allows better conservation of the energy contained in the aerodynamic motion during intake of an engine cycle. Thus, the turbulence level initiating combustion is higher than in purely tumble type pipes, especially for lift laws suited to Miller cycle operation.

Significant combustion efficiency gains are obtained using intake devices according to the invention. Furthermore, the architecture of these intake devices involves no additional constraint for arrangement within a cylinder head of a single-cylinder or multi-cylinder engine, which is a significant advantage in relation to existing solutions for generating swumble.

The invention claimed is:

1. A gas intake pipe for a cylinder of an internal-combustion engine, the intake pipe comprising means for diverting the gas so as to generate an aerodynamic motion of the gas within the cylinder about an axis substantially perpendicular to the axis of the cylinder, the diversion means comprising a ramp shape on the lower profile of the intake pipe, and a concave shape of the upper profile of the intake pipe, the lower and upper profiles of the intake pipe being defined in position of use of the intake pipe, characterized in that the radius of curvature R1 of lower profile forming the ramp is less than 40 mm, and in that the concave shape of the upper profile comprises an intermediate zone whose radius of curvature R3 ranges between 50 and 150 mm, and a final zone whose radius of curvature R2 ranges between 10 and 100 mm, the final zone facing the ramp shape of the lower profile.

2. An intake pipe as claimed in claim 1, wherein the radius of curvature R1 of the lower profile forming the ramp ranges between 20 and 30 mm, preferably between 25 and 27 mm.

3. An intake pipe as claimed in claim 1, wherein the radius of curvature R3 of the intermediate zone ranges between 100 and 130 mm.

4. An intake pipe as claimed in claim 1, wherein the radius of curvature R2 of the final zone ranges between 60 and 70 mm.

5. An intake pipe as claimed in claim 1, wherein the lower profile comprises an initial zone of concave shape whose radius of curvature R5 ranges between 200 and 350 mm, preferably between 230 and 300 mm, and more preferably between 270 and 280 mm.

6. An intake pipe as claimed in claim 5, wherein the arc length of the ramp shape ranges between 6 and 9% of the arc length of the concave shape of the initial zone of the lower profile, preferably it substantially corresponds to one thirteenth of the arc length of the concave shape of the initial zone of the lower profile.

7. An intake pipe as claimed in claim 1, wherein the upper profile comprises an initial zone of convex shape, and preferably the radius of curvature R4 of the initial zone of the upper profile is greater than or equal to 400 mm.

8. An intake pipe as claimed in claim 7, wherein the arc length of the initial zone of the upper profile is substantially equal to the sum of the arc lengths of the intermediate and final zones of the upper profile.

9. An intake pipe as claimed in claim 1, wherein the ratio of the maximum cross-sectional area to the minimum cross-sectional area of the intake pipe ranges between 1 and 2, and it preferably is 1.5.

10. An intake pipe as claimed in claim 1, wherein means for diverting the gas further have an inclination of the intake pipe defined by an angle β of tangent to the point of intersection of the intake pipe with the outlet of the intake pipe ranging between 0° and 45°, preferably between 5° and 45°.

11. An intake pipe as claimed in claim 1, wherein the intake pipe comprises means for generating an aerodynamic motion of the gas within the cylinder about an axis parallel to the axis of the cylinder.

12. A gas intake device for a cylinder of an internal-combustion engine, the gas intake device comprising an intake pipe as claimed in claim 1, at least one intake valve arranged within the intake pipe, at least one calibration part of the intake valve arranged at one end of the intake pipe and directed at the fire face (FF) of the cylinder, characterized in that, on the lower profile of the intake pipe, intersection between the intake pipe and the calibration part of the intake valve is on a generatrix (YY) forming an angle α ranging between 50 and 45° with respect to a plane (F'F') parallel to the fire face (FF) of the cylinder passing through a point of intersection between the intake pipe and the calibration part.

13. An intake device as claimed in claim 12, wherein the angle α ranges between 5° and 20°, preferably between 8° and 15°.

14. An internal-combustion engine comprising at least one cylinder provided with at least one intake pipe as claimed in claim 1, at least one exhaust pipe and fuel injection means.

15. Use of an internal-combustion engine as claimed in claim 14 for a Miller cycle or an Atkinson cycle.

16. A method of operating the internal-combustion engine according to claim 14, comprising operating the internal-combustion engine in a Miller cycle or an Atkinson cycle.

* * * * *